Feb. 9, 1943.    G. L. MacNEILL    2,310,587
SELF-CLEANING STRAINER
Filed July 24, 1942    6 Sheets-Sheet 1

INVENTOR.
George L. MacNeill
BY
ATTORNEY.

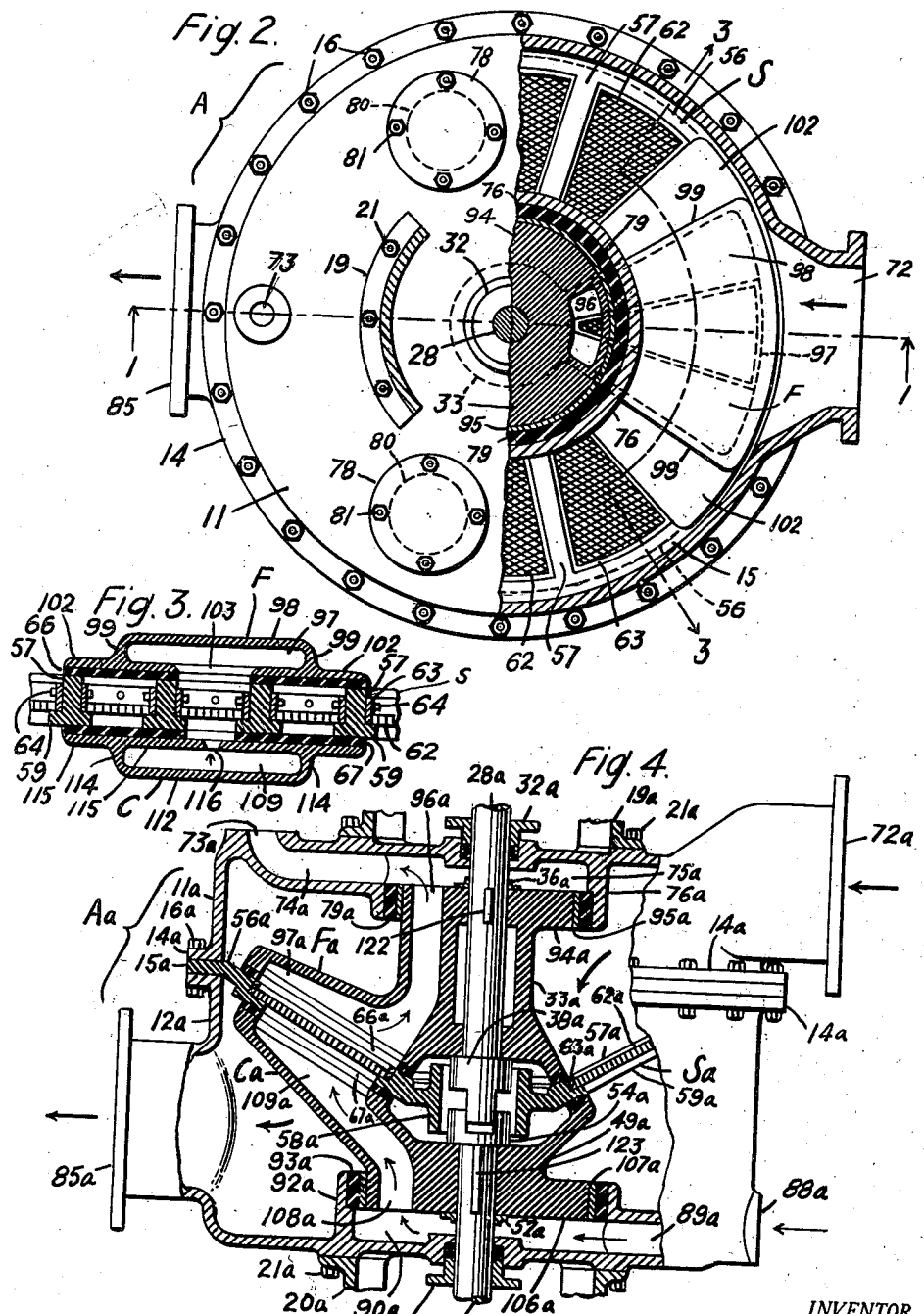

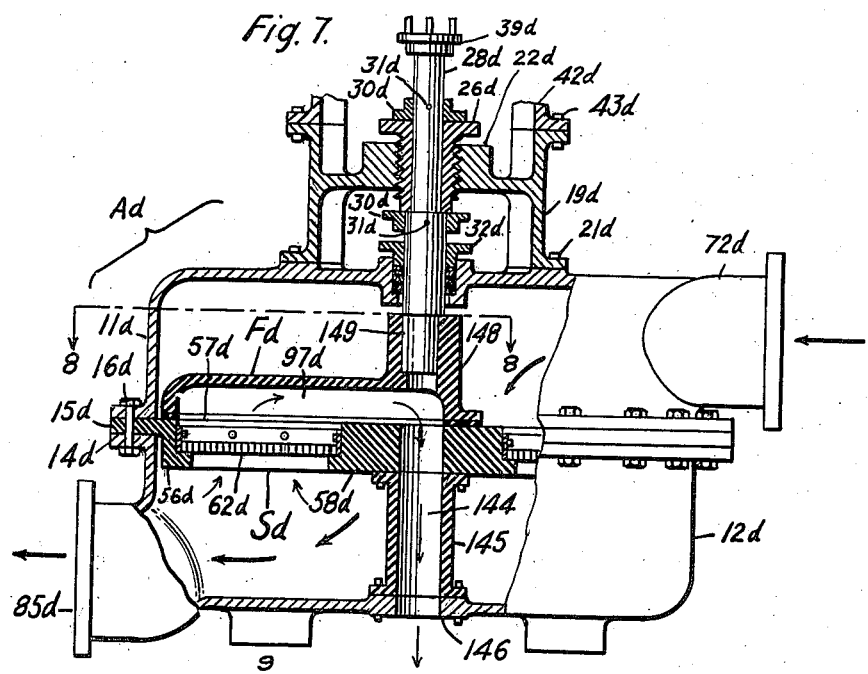
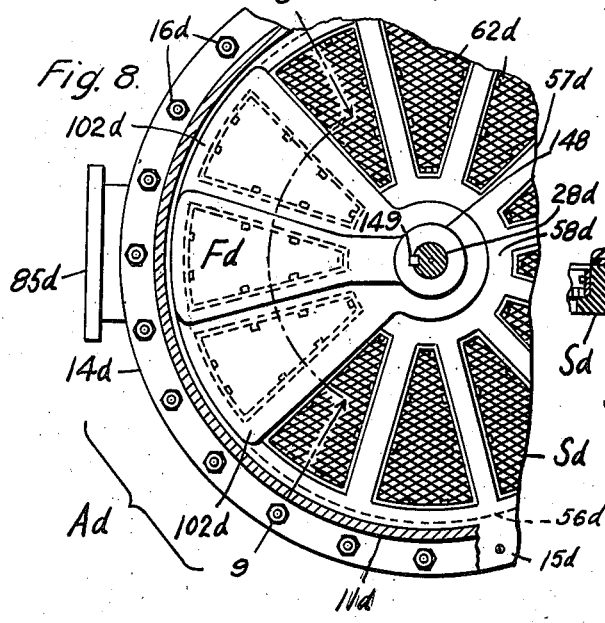
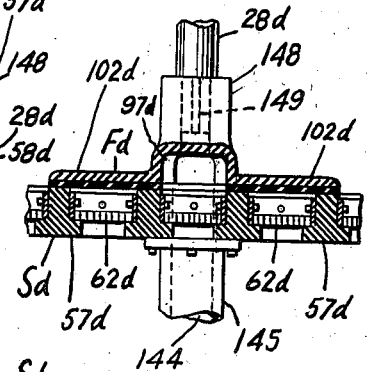

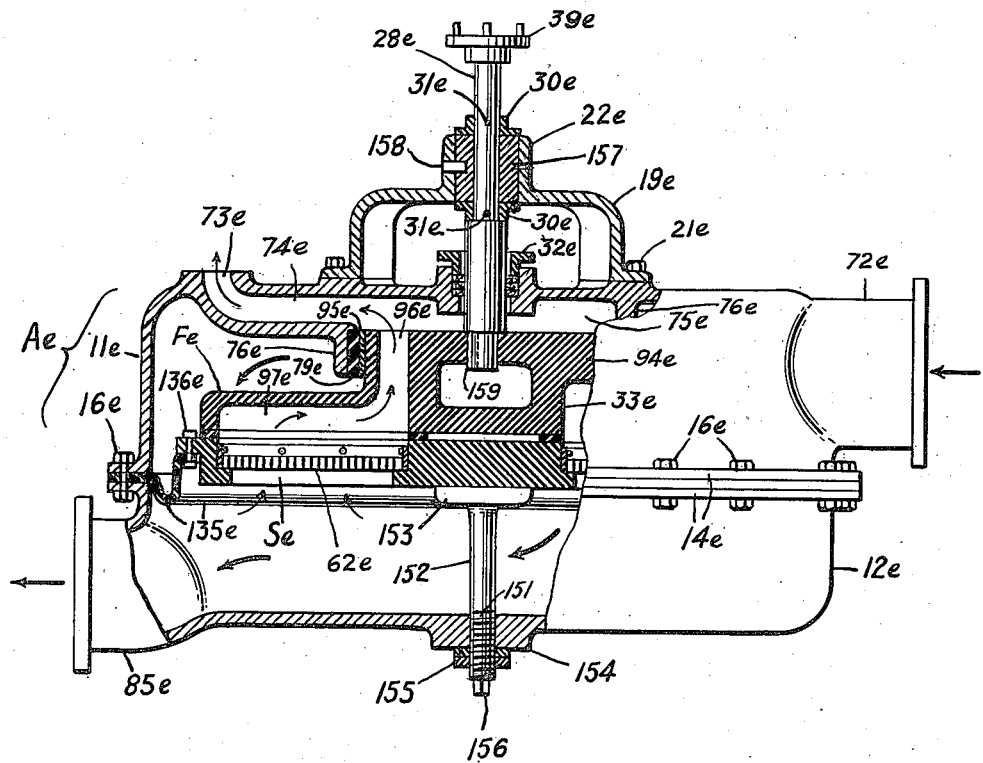

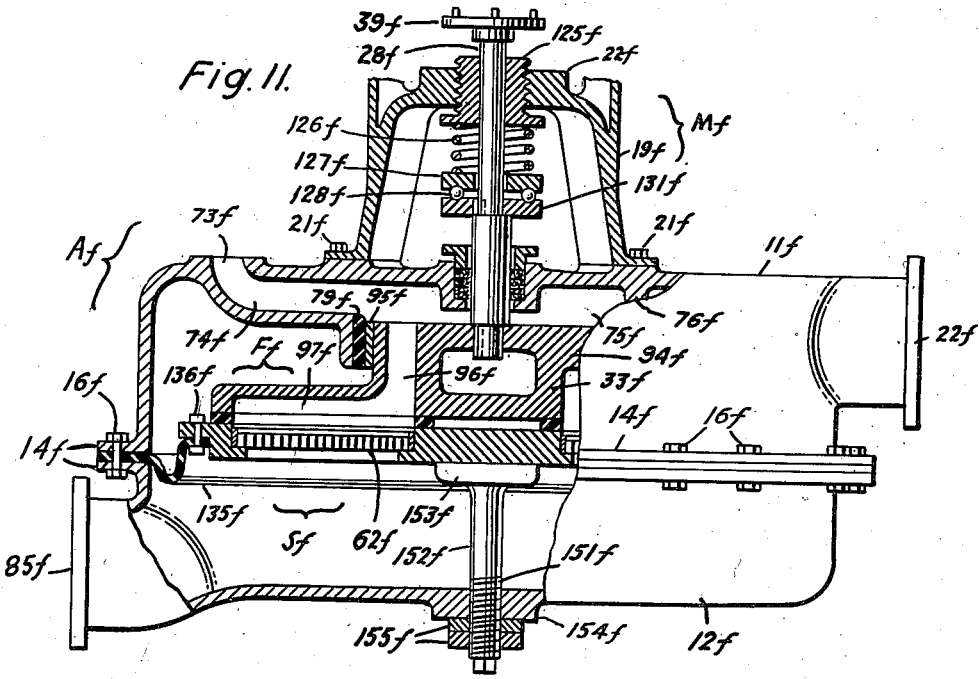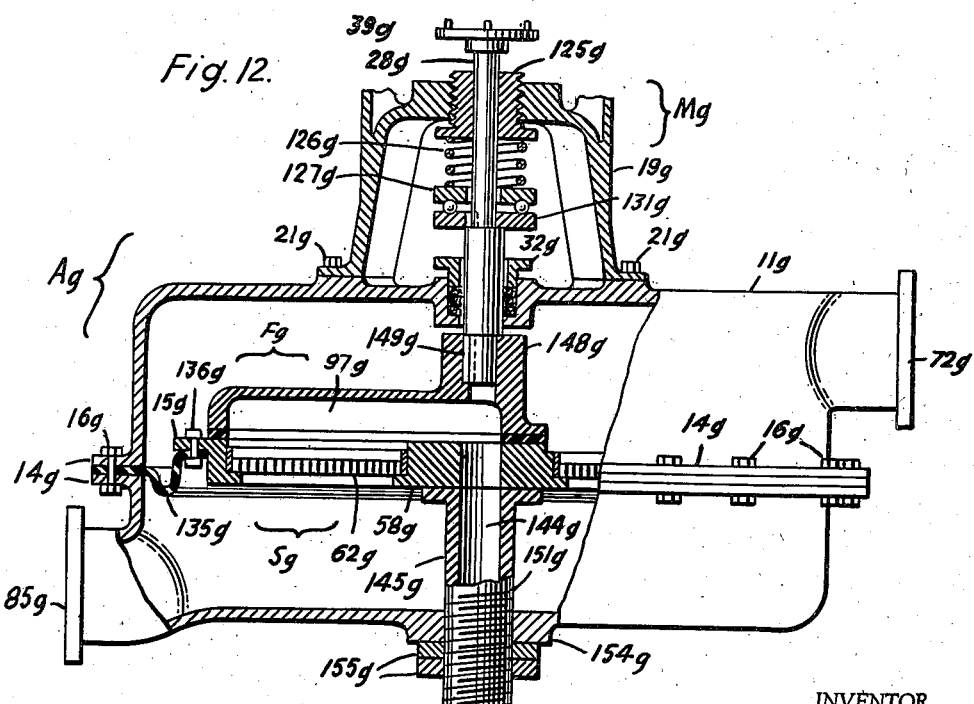

Patented Feb. 9, 1943

2,310,587

UNITED STATES PATENT OFFICE 2,310,587

SELF-CLEANING STRAINER

George L. MacNeill, Reading, Pa.

Application July 24, 1942, Serial No. 453,210

7 Claims. (Cl. 210—152)

My invention relates to means for, and methods of, straining or filtering fluids, and particularly to means and methods of this character operating on the principle of cleaning the straining media by the flow of cleansing fluid therethrough counter to the flow of fluid being strained.

Such devices and methods are broadly applied for removing suspended solids from water, as in filtering plants, water supply systems, general water purification processes, reclaiming valuable ore products in mining operations, salvaging certain elements of machine operations, and in various other uses, but may also be employed to filter fluids, such as petroleum products, liquids, gases and the like.

A strainer has heretofore been constructed in which the straining member is rotated in a casing, between stationary cleansing and flushing boxes, thus not only embodying bearing means between the strainer and the boxes, but also requiring bearing structure between the strainer and the casing that must prevent the fluid from by-passing the strainer.

Particularly in this latter feature, in providing and maintaining proper bearing contact and sealing effect between the strainer and the casing, difficulties result from such factors as abrasion caused by the presence of sand, grit, nd other foreign matter in the fluid being strained.

These difficulties also necessitate the use of expansive abrasion-resistant alloys, and the device, irrespective of this feature, and of the cost and complication of manufacture thus involved, is still rendered inefficient, or totally incapable of proper operation, under certain severe conditions, in a comparatively short period of time.

Further, as a result of the inertia of the strainer, and of frictional resistance caused by rubbing contact between the bearing surfaces of the casing and the rotative strainer, such device is inherently extravagant of driving power.

Another device has heretofore been constructed, wherein the strainer cooperates with a flushing box, in the inlet chamber of the casing, adapted to receive a back flow of cleansing fluid through the strainer from the outlet, or strained fluid, chamber of the casing.

Such device has, in general, the difficulties above set forth, in addition to other disadvantages of its own, such as that wherein the flow of cleansing fluid from the outlet chamber to the discharge point of the cleansing fluid, usually at atmospheric pressure, is dependent upon the pressure differential between the outlet chamber and the surrounding atmosphere.

This condition limits the use of the device to pressure service, and to such service in which the pressure differential is adequate to cause effective back washing action. When the strainer becomes fouled, as during a flood, when excessive amounts of debris enter the device, the hydraulic pressure loss, or drop, between the inlet and outlet chambers increases, whereby the available pressure to cause the back washing, or counter flow, decreases. Thus, the latter device is rendered incapable of cleaning itself at a period when its effective operation is imperative.

Also, a prior device, embodying the strainer rigidly mounted in the casing, in cooperation with a rotatable flushing box to cause a back flow of strained fluid through the strainer to the outer atmosphere, is subject to the loss of effective cleaning action from wear, and is rendered inoperative in a zone of less than atmospheric pressure.

In a device, in which either the strainer or the flushing box means is intermittently rotative, or turned step by step, it is necessary to automatically shut off the supply of cleanser fluid during the turning movement, and to turn it on again, at the end of each step. This feature necessitates the use of a valve system, and has other objectionable qualities. A device of this type is known, in which a flushing box, and a cleansing box, bear against the strainer only at the ends of the steps, these boxes being purposely lifted away from the strainer during the step, or partial turning, movement. It has no means for maintaining constant, yieldable, or resilient contact between the bearing surfaces, and introduces the cleansing fluid to the device, through an element of the strainer constituting part of the casing. Another device of this type carries the cleanser fluid therefrom through a hollow shaft for rotating the flushing box, and has no means for adjusting its bearing surfaces.

Another former device has embodied a rotatable upright cylindrical, or cage like, strainer divided, by radial partitions, into sector-like compartments cooperating with a stationary flushing box between the strainer and the casing, and successively cleaned by a flow of fluid from the outlet compartment of the device to a point of waste disposal.

Such device is subject to undue wear at the upper and lower portions, and around the radially outer edges, of the partitions, resulting in ineffective cleaning and loss of unstrained fluid.

The fluid being strained, is also lost through the clean-out port, at a rate corresponding to the cubical content of the strainer, for each revolution of the cage, the device being also limited to pressure service.

In certain devices of the prior art, strainer elements of the disk or other type, present the strainer area to the fluid flow entirely, or generally, in upright position whereby, for this or other reason of uneven force distribution, waste deposits are concentrated at local positions on the strainers, as by being precipitated to the bottom of the upright strainer surface by gravity. This condition clogs the device, requires special hand-hole cleaning ports at particular places, unduly shortens the time during which the apparatus may operate effectively, and has other disadvantages.

Another objection to strainers heretofore employed, has resided in the fact that glands or stuffing boxes, for rotatable shafts extending between sources of power exteriorly of the casings and rotatable elements in the casings, are not always under pressure, whereby leakage of air into the casing tends to destroy the partial vacuum necessary for effective operation, as when operating at the suction side of a pump.

A further objection to former strainers results from the inability of the flushing boxes and the strainers, or the bearing means therefor, to effectively yield relative to each other, when extra large foreign particles, such as sticks or stones, become lodged between these bearing means.

An object of my invention is to overcome all of the above-mentioned disadvantages and difficulties of prior art devices of the back-washing type, and to provide a method and a means of the above-indicated character, in which each of the features is so improved by novel means involved therein, or appertaining thereto, as to render the device considerably more effective and desirable from every standpoint.

Another object of the invention is to provide back-washing filter means in which, by a combination of a generally immovable, or non-rotative, strainer element, a flushing box means which may be continuously moved or rotated, and means, operative from position exteriorly of the casing for adjusting the box means and the strainer element, or the bearing means therefor, the bearing means, between the strainer and the casing, may be entirely eliminated, the danger of leakage and the necessity for expensive alloys at this point removed, and the bearing means between the flushing box means and the strainer element constantly maintained at a high degree of effective contact.

Another object of the invention is to effect adjustment, including compensation for wear, of the bearing surfaces between a movable flushing or cleanser box structure and a generally stationary strainer element, by means operating from position exterior to the casing.

Another object is to effect such adjustment by means that is automatic, or resilient, or equivalently positively yieldable in opposite directions, whereby the device effects its adjustments unattended, and the bearing surfaces yield, when large foreign objects enter therebetween, to avoid stoppage of, and damage to, the machine.

Another object of the invention is to effect adjustment between the strainer and the flushing box, or the bearing means therefor, by an action involving floating adjustment of the strainer.

Another object of the invention is to avoid concentration of debris or waste, at local position on the strainer of a filter of the back-wash type, as by forming and mounting the strainer in such relation to the casing and other parts, and to the fluid flow, as to have all, or the greater component, of the strainer area generally transverse to a force, such as gravity, causing such concentration, or equivalently placed, so that the waste is evenly distributed and maintained on the strainer until washed away by the counterflow of cleansing fluid, whereby to ensure longer and better operation of the device, to avoid special hand hole construction, to preclude damage by such concentration, to render unnecessary periodic stoppages of the machine, and hand cleaning operations, from this cause, and to provide other advantages.

Another object of the invention is to provide bearing surface adjustment, compensating for wear, between cleanser box, or flushing box, means having rotative movement, and a non-rotative strainer of the disk type, and to provide means whereby the box means may rotate continuously relative to a non-rotative strainer of such type.

Another object of the invention is to provide a strainer of the back-washing type that is equally adaptable to service under pressure or under partial vacuum, or, in certain forms, adaptable to pressure service only.

Another object of the invention is to provide a strainer of the above-indicated character that may be operated by reduced power, in which glands, or stuffing boxes, are maintained under pressure at all times, and in which these and the other features above pointed out are employed or combined in accordance with the invention.

Another object of the invention is to provide a device having a movable flushing box and a non-rotative strainer, in which the cleaner fluid is introduced to the box by means independent of the strainer, or any element thereof, and emitted from the casing independent of the shaft for rotating the flushing box, and in which the bearing means between the strainer and the box are adjustable.

A further object of the invention is to provide a device of the above-indicated character that is simple and durable in construction, economical to manufacture, and effective in its operation.

With such objects in view, as well as other advantages which may be incident to a utilization of the improvements, the invention comprises the elements and combinations thereof hereinafter set forth and claimed, with the understanding that the several necessary elements constituting the same may be varied in proportion, arrangement, texture and other features, without departing from the spirit and scope of the invention as intended, and as set forth in the drawings, specification and claims.

In order to render the invention more clearly understood, means are shown in the accompanying drawings for carrying the same into practical effect, without limiting the improvements in the useful applications thereof, to the particular constructions shown and described, which are given merely by way of example.

In the drawings:

Fig. 2 is a view of the device of Fig. 1, taken substantially along a line 2—2 of that figure;

Fig. 3 is a detail view, taken substantially along a line 3—3 of Fig. 2;

Fig. 4 is a view similar to Fig. 1, but partially in side elevation, of the invention in another form;

Fig. 7 is a view similar to Fig. 1, of the invention in another form;

Fig. 8 is a view, taken substantially along a line 8—8 of Fig. 7;

Fig. 9 is a detail view, taken substantially along a line 9—9 of Fig. 8; and

Fig. 10 is a view similar to Fig. 1, of the invention in a further form.

Figure 1:
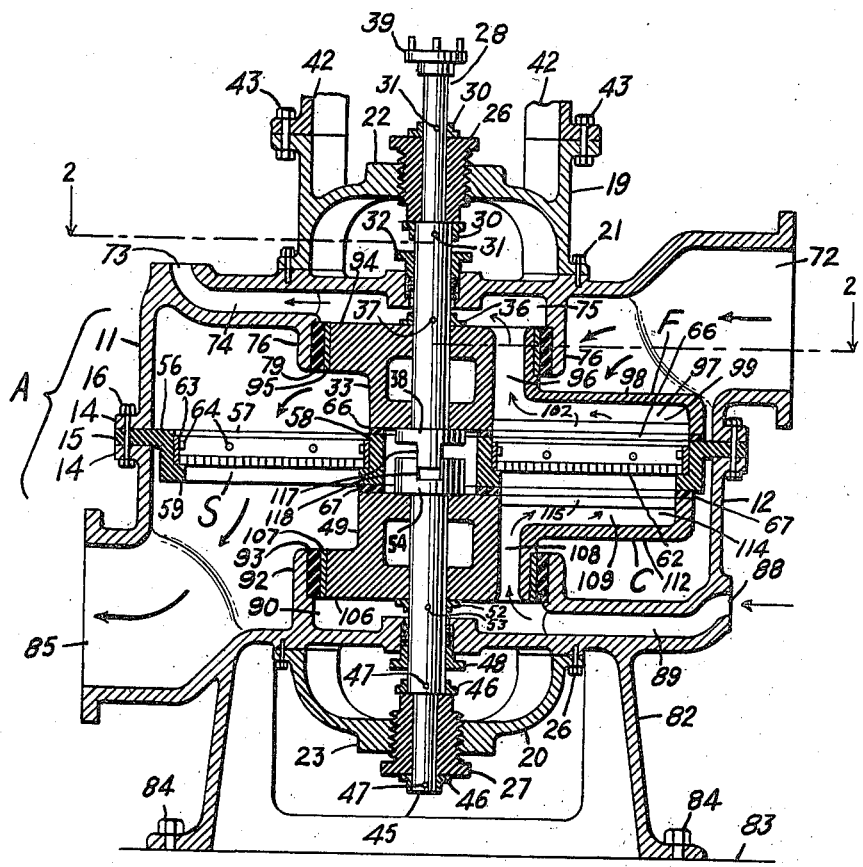
Figure 1 is a view, generally in section, taken substantially along a line 1—1 of Fig. 2, of a strainer device, or filter, constructed in accordance with one practical embodiment of the invention.

Referring to Figs. 1, 2 and 3, the device comprises, in general, a casing A, a strainer S, in the casing, and cleanser and flushing box means C and F, in register with each other at opposite sides of the strainer S, respectively.

The casing A comprises upper and lower shells 11 and 12, respectively, having adjacent flanges 14, between which, a flange 15, of the strainer S, is disposed, and all of which flanges are connected, as by bolts 15.

The shells 11 and 12 are provided with brackets 19 and 20, secured to the upper and lower sides thereof, as by screws 21, and having interiorly screw threaded portions 22 and 23, which support exteriorly screw threaded sleeves or nuts 26 and 27, respectively.

An upper shaft 28, longitudinally fixed in position in the sleeve 26, as by collars 30 and pins 31, extends through a stuffing box, or gland, 32 in the shell 11, and into a hub 33 of the flushing box means F, to which it is fixed, as by a collar 36 and a pin 37, at the upper side of the hub, and by a coupling head 38 fixed to, or forming part of, the shaft, at the lower side of the hub.

The shaft 28 is also provided, at its upper end, with a coupling element 39 for attachment to driving means (not shown), such as an electric motor mounted on an extension 42 of the bracket 19 secured thereto, as by bolts 43.

A lower shaft 45, longitudinally fixed in position in the sleeve 27, as by collars 46 and pins 47, extends through a stuffing box 48 in the shell 12, and into a hub 49 of the cleanser box C, to which it is fixed, as by a collar 52 and a pin 53, at the lower side of the hub, and by a coupling head 54 fixed to the shaft at the upper side of the hub. The hubs 33 and 49 are fixed to the shafts 28 and 45, to rotate therewith, as by being splined or keyed thereto.

The strainer, or filter, element S, which, in the form of the invention shown in Figs. 1, 2 and 3, is of disk-like form, has a cylindrical, or ring-like, portion 56, depending from the flange 15, and provided with radial arms, or spoke-like portions, 57 extending to an inner cylindrical, or ring-like, hub, forming sector-like apertures through the strainer surrounded by lower flanges 59.

Grids 62, disposed in, and conforming to, the sector-like apertures in the strainer S, rest on the flanges 59, and are provided with perimetral sheet-metal frame elements 63 secured to the ring 56, the spokes 57 and the hub 58, as by screws 64.

The hub 58 surrounds the coupling heads 38 and 54, in radially spaced relation thereto, and acts as bearing means for the cleanser box C and the flushing box F, through the intermediary of yieldable facing elements 66 and 67, constructed of material, such as rubber, and conforming, in horizontal-plane contour, to both the hubs and to the boxes C and F.

The upper shell 11 further comprises an inlet port 72 for sludge-bearing fluid to be strained, the flow, or course, of which is indicated by heavy-line arrows, and an outlet port 73, for a used, or sludge-carrying, cleanser fluid, after it passes through the strainer S, the flow of which is indicated by light-line arrows.

The outlet port 73, for the used cleansing fluid, communicates, through a passageway 74, with an annular space 75 formed by a flange 76 depending from the top wall of the upper casing shell 11, and supporting a yieldable cylindrical bearing 79, as of cutless rubber. Hand-hole covers 78, secured in position over apertures 80 in the top wall of the shell 11, as by bolts 81, may be provided for inspection and cleaning of the strainer S.

The lower shell 12 further comprises a base 82, for attachment to a floor 83, as by screws 84, an outlet port 85 for the strained fluid, the flow of which is also indicated by heavy-line arrows, and an inlet port 88 for the fresh cleanser fluid, the flow of which is indicated by light-line arrows. The inlet port 88, for the fresh cleansing fluid, before it passes through the strainer S, communicates, through a passageway 89, with an annular space 90 formed by a flange 92 projecting upwardly from the bottom wall of the lower casing shell 12, and supporting a yieldable bearing 93 similar to the bearing 79.

The flushing box F, in addition to the hub 33, comprises an annular bearing portion 94, which supports a wearing sleeve 95 for rotative sliding contact with the yieldable bearing 79.

A passageway 96, in the annular portion 94, provides communication between the annular space 75 and a sector-like space 97 in a correspondingly shaped shell-like portion of the flushing box F, having a top wall 98, side walls 99, and bottom wings or aprons 102 bearing against the top sides of the ring 56, and the spokes 57, through the intermediary of the facing element 66, above mentioned.

The wings 102, and the facing element 66, cover, or close, the outside grids of three grids spanned or covered by the box F as a whole, but leave the center grid of these three grids open to the box, as by a passageway 103, better shown in Fig. 3, and conforming to the sector-like area of this center grid.

Similarly, the cleanser box C, in addition to the hub 49, comprises an annular bearing portion 106, which supports a wearing sleeve 107 for rotative sliding contact with the yieldable bearing 93. A passageway 108, in the annular portion 106, provides communication between the annular space 90 and a sector-like space 109 in a correspondingly shaped shell-like portion of the cleanser box C, having a bottom wall 112, side walls 114, and top wings 115 bearing against the under sides of the ring 56, and the spokes 57, through the intermediary of the facing element 67, also hereinabove mentioned.

The wings 102, and the facing element 67, similarly cover the outside grids of the three grids, above mentioned as spanned by the box F as a whole, but, instead of leaving the center grid of these three grids entirely open to the box, as in the case of the flushing box F, the wings leave this grid open to the cleanser box C only through a narrow slot 116, Fig. 3, constituting a force spray nozzle for the incoming fresh cleanser fluid. This slot, as shown, extends along a radius of the flushing box, parallel to the disk plane of the strainer, but may be placed at an angle to such radius, for a purpose that will hereinafter appear.

The coupling head 38, at the lower end of the upper shaft 28, has a depending tongue or projection 117 fitting a groove or slot 118 in the coupling head 54, at the upper end of the lower shaft 45, whereby to lock these shafts together for rotation together, but to permit longitudinal, or axial, movement of the shafts relative to each other.

Operation

The fluid to be strained, enters the port 72 to the inlet chamber of the device, formed between the strainer S and the upper shell 11, and flows through all of the sector-like grids 62, except the above-mentioned three grids covered by the flushing box F. Matter to be removed from the fluid, such as foreign objects larger than the mesh of the strainer, is deposited on the strainer S, and the strained fluid passes to the outlet chamber of the device, formed between the strainer S and the lower shell 12, and from this chamber through the outlet port 85.

While the above-mentioned flow is occurring, and during the time that the cleanser and flushing boxes are opposite any one set of three grids, a clean, or fresh, cleanser fluid enters the port 88, and flows, counter to the direction of the fluid being strained, through the passageway 89, to the annular space 90, and through the passageway 108, to the sector-like space 109 of the cleanser box C. From the latter space, the cleanser fluid passes through the force stream nozzle, or slot, 116, through the above-mentioned center grid, to clean the latter, and to carry the sludge-bearing cleanser fluid to the sector-like space 97 of the flushing box F, through the passageway 96, to the annular space 75, through the passageway 74, and through the outlet port 73, to a point of disposal.

In devices, as heretofore constructed, cleanser and flushing boxes are either stationary, or intermittently rotatable, or turnable, as in a step-by-step movement from grid to grid, during which the flow of cleanser fluid is shut off. In such operation, automatically controlled valve means must be provided in the cleanser fluid circuit, and other expense and objection are present, rendering the devices undesirable and ineffective.

In my invention, by the provision of the wings 102 and 115 on the movable boxes, the movement, or rotation, of the latter may be continuous, and this feature, in combination with the exterior adjustment afforded by the sleeves 26 and 27, or by other means, such as herein set forth, for the constantly moving boxes, overcomes all of the objections, in this relation, to the former devices.

With the above-mentioned wings, the continuous movement, or rotation, of the boxes, may be effected, without allowing interflow between the cleanser fluid and the fluid being strained, since, when the radial slot or nozzle 116 is opposite any one grid at any point, the latter grid is closed by the flushing box. As the boxes progress in unison, in this continuous movement, there is always, except at the instant that the nozzle is closed by a spoke 57, a center grid being flushed by the nozzle in a group of three, and a wing portion at either side of this center grid cooperating with one of the spokes 57 to avoid interflow of either the fluid to be strained, or the strained fluid, with the cleanser fluid. With the slot 116 at an angle to the above-mentioned radius, parallel to the plane of the strainer disk, entire closure of the slot will not occur, when the latter is passing a spoke 57.

The action is considerably more effective than the former step-by-step action, with its automatic valve means and other objections, is more economical of cleansing fluid, and, in the provision of a device in which objections to a movable strainer, as hereinbefore pointed out, are also overcome, the invention is a distinct advance in its field.

A permanently effective, or adjustable, seal, between the bearing surfaces of the boxes and the cooperating bearing surfaces on the strainer, is also considerably more readily and advantageously obtained by means exterior to the casing, such as the sleeves 26 and 27, than were such adjustment to be also attempted in connection with a movable strainer, as now appears.

By the invention hereof, as shown in Figs. 1, 2 and 3, to produce and maintain effective seal between the boxes and the strainer, to compensate for wear, it is only necessary to turn the sleeves 26 and 27, in a simple movement, from readily accessible position. This action causes the box means to move parallel to the shafts 28 and 45, relative to the yieldable bearings 79 and 93, and to create, or relieve, pressure of the boxes on the yieldable facing elements 66 and 67.

The arrangement, in which the entire face of the strainer is presented upwardly to the incoming fluid to be strained, prevents local concentrated deposit of waste on the strainer, which concentration may occur in any former strainer of the back-wash type of which I am aware.

The flow of cleansing fluid may be introduced at any pressure suitable for effective cleaning, without adversely affecting the operation of the device, whether such operation be under pressure or a partial vacuum.

Also, the use of expensive abrasion-resistant alloys, difficult to machine, is not necessary or desired, for the general purposes to which the invention is broadly adapted.

Device of Fig. 4

In this figure, parts corresponding to those above set forth, are designated by corresponding reference letters and numerals, each having the subscript $a$.

The construction, operation and advantages are similar to those of the device of Figs. 1, 2 and 3, except that, instead of the disk strainer S, a strainer $Sa$, of substantially frusto-conical form is provided, whereby its diameter may be reduced relative to that of the disk, for the same area, and, by the particular selection of the slope of the cone side walls, the advantages may be retained of having the major component of the straining surface of these walls facing upwardly to the incoming fluid to be strained, to avoid local concentration of deposited matter incident to the use of a strainer of any type having its filter surface at, or approaching too nearly, the vertical.

Similarly to the device first above described, the device of Fig. 4 comprises, in general, a casing A$a$, a strainer S$a$ in the casing, and cleanser box means C$a$ and flushing box means F$a$ at opposite sides of the strainer S$a$.

The casing A$a$ comprises upper and lower shells 11$a$ and 12$a$, respectively, having adjacent perimetral flanges 14$a$, between which a flange 15$a$ of the strainer S$a$ is disposed, and all of which flanges are connected, as by bolts 16$a$.

The shells 11$a$ and 12$a$ are provided with brackets 19$a$ and 20$a$, secured thereto, as by screws 21$a$, which support exterior means, such as the screw threaded sleeves or nuts 26 and 27, respectively, of the device of Figs. 1, 2 and 3, or of devices later to be described.

An upper shaft 28$a$ extends through a gland 32$a$, into a hub 33$a$ of the flushing box F$a$, to which it is fixed, as by a collar 36$a$, pinned to the shaft at the upper side of the hub, and, by a coupling head 38$a$ fixed to the shaft at the lower side of the hub. The shaft 28$a$ is to be provided, as in the case of the device of Fig. 1, with means for driving it.

A lower shaft 45$a$ extends through a gland 48$a$, and into a hub 49$a$ of the cleanser box C$a$, to which it is fixed, as by a collar 52$a$, at the lower side of the hub, and by a coupling head 54$a$ fixed to the shaft at the upper side of the hub. The hubs 33$a$ and 49$a$ are fixed to the shafts 28$a$ and 45$a$ to rotate therewith, as by keys 122 and 123, respectively.

The strainer S$a$ has an annular portion 56$a$ connected to the flange 15$a$, inside the casing A$a$, and provided with spoke-like portions 57$a$ extending inwardly and downwardly to an inner hub 58$a$, forming sector-like apertures through the frusto-conical sides of the strainer surrounded by lower flanges 59$a$.

Grids 62$a$, disposed in, and conforming to, the sector-like apertures in the strainer S$a$, rest on the flanges 59$a$, and are provided, as in the form of Fig. 1, with perimentral sheet-metal frames 63$a$ secured to the ring 56$a$, the spokes 57$a$, and the hub 58$a$, as by screws.

The hub 58$a$ surrounds the coupling heads 38$a$ and 54$a$, and acts as bearing means for the cleanser box C$a$, and the flushing box F$a$, through the yieldable facing elements 66$a$ and 67$a$.

The upper shell has an inlet port 72$a$ for fluid to be strained, and an outlet port for cleansing fluid, after it passes through the strainer S$a$, the flow of these fluids being indicated by heavy and light-line arrows, respectively.

The outlet port 73$a$ communicates, through a passageway 74$a$, with an annular space 75$a$ formed by a flange 76$a$ depending from the top wall of the shell 11$a$, and supporting a yieldable bearing 79$a$.

The shell 12$a$ comprises an outlet 85$a$ for the strained fluid, and an inlet port 88$a$ for the cleansing fluid. The inlet port 88$a$ communicates, through a passageway 89$a$, with an annular space 90$a$ formed by a flange 92$a$ projecting upwardly from the bottom wall of the lower casing shell 12$a$, and supporting a yieldable bearing 93$a$, similar to the bearing 79$a$.

The flushing box F$a$, in addition to the hub 33$a$, comprises an annular bearing portion 94$a$, which supports a wearing sleeve 95$a$ for contact with the bearing 79$a$. A passageway 96$a$, in the annular bearing portion 94$a$, provides communication between the annular space 75$a$ and a sector-like space 97$a$, in a correspondingly shaped shell-like portion of the flushing box F$a$, which, similarly to the box F, as seen in Fig. 3, has a top wall, side walls and bottom wings, corresponding to the elements 98, 99 and 102, respectively.

The box F$a$ covers three grids at a time, leaving the center of these three open to the box, as in the above-described form.

The cleanser box C$a$ further comprises a bearing portion 106$a$, which supports a wearing sleeve 107$a$ for contact with the bearing 93$a$. A passageway 108$a$, in the portion 106$a$, communicates between the space 90$a$ and a sector-like space 109$a$ in a sector-like shell portion of the cleanser box C$a$, having a bottom wall, side walls and top wings bearing against the underside of the ring 56$a$, the spokes 57$a$ and the hub 58$a$, through the facing element 66$a$, as above pointed out.

The wings of the box C$a$, and the facing element 67$a$, also cover the outside grids of the three grids above set forth, and similarly, instead of leaving the center grid entirely open to the cleanser box, leave this grid open to this box only through a narrow slot, similar to the slot 116.

The coupling head 38$a$ has a tongue, similar to the tongue 117, fitting a groove, similar to the groove 118, in the head 54$a$ for operation, as above set forth, relative to the corresponding parts in the device of Fig. 1.

In the form of Fig. 4, the adjustment of the bearing surfaces may be effected as shown and described in connection with the device of Fig. 1, or automatically, as to be described in connection with the form of Fig. 5, which may also be substituted in the device of Fig. 1.

Figure 5:
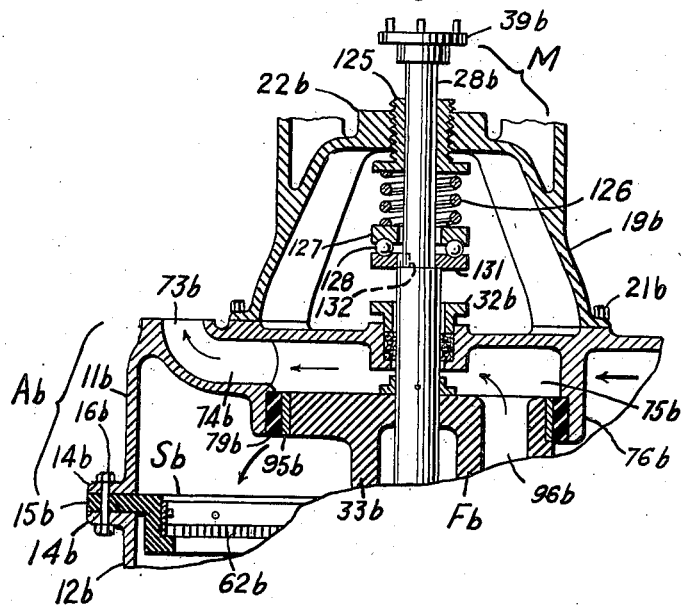
Fig. 5 is a view similar to the upper portion of Fig. 1, of the invention in another form.

Device of Fig. 5

In this figure, parts corresponding to those of the previous figures are designated by corresponding letters and numerals having the subscript $b$.

The bearing surfaces of a flushing box F$b$ are automatically adjusted from position exterior to the casing A$b$, relative to the bearing surfaces of a strainer S$b$, as by a mechanism M, comprising a sleeve 125 screw threadably mounted in a portion 22$b$ of a bracket 19$b$ that is secured to a top shell 11$b$ of the casing A$b$, as by screws 21$b$.

A shaft 28$b$, provided with a drive connecting coupling 39$b$, is longitudinally slidably, and rotatively, journaled in the sleeve 125, and is surrounded by a helical compression spring 126 between the sleeve and a ball-race ring, or washer-like element, 127 that also surrounds the shaft in rotative, and longitudinally movable, relation thereto. The element 127 bears, axially of the shaft, against ball-bearing means 128 supported on another ball-race member 131 that is fixed to the shaft 28$b$, as by a key 132, and acts against a shoulder on the shaft provided by a portion of larger diameter than the portion surrounded by the mechanism M.

In operation, the device of Fig. 5, which may be employed in the devices of Figs. 1, 4, 6, 7, and 10, instead of the adjusting means previously described, automatically maintains the bearing surfaces, associated with the flushing box F$b$, in contact with the bearing surfaces associated with the strainer S$b$, by a yielding, or resilient, action operating positively to oppose movement of the strainer and box bearing means away from each other, and to positively bias the same together, such that, when an object in the fluid to be strained, such as a stone or a stick, works its way between the bearing surfaces, the latter yield relative to each other, to avoid damage thereto, or other trouble from this cause.

By manipulating the sleeve or nut 125, the degree of compression of the spring 126, and consequently, the force tending to maintain the bearings together, may be adjusted to any desired value.

The device of Fig. 5 further comprises a bottom shell 12b, a flange 15b, of the strainer Sb, held between flanges 14b, as by bolts 16b. Also provided, are grids 62b, a hub 33b, a pasasgeway 96b, a flange 76b, an annular space 75b, a passageway 74b, a cleansing fluid outlet 73b, a gland 32b, a bearing 79b, and a wearing sleeve 95b.

Figure 6:
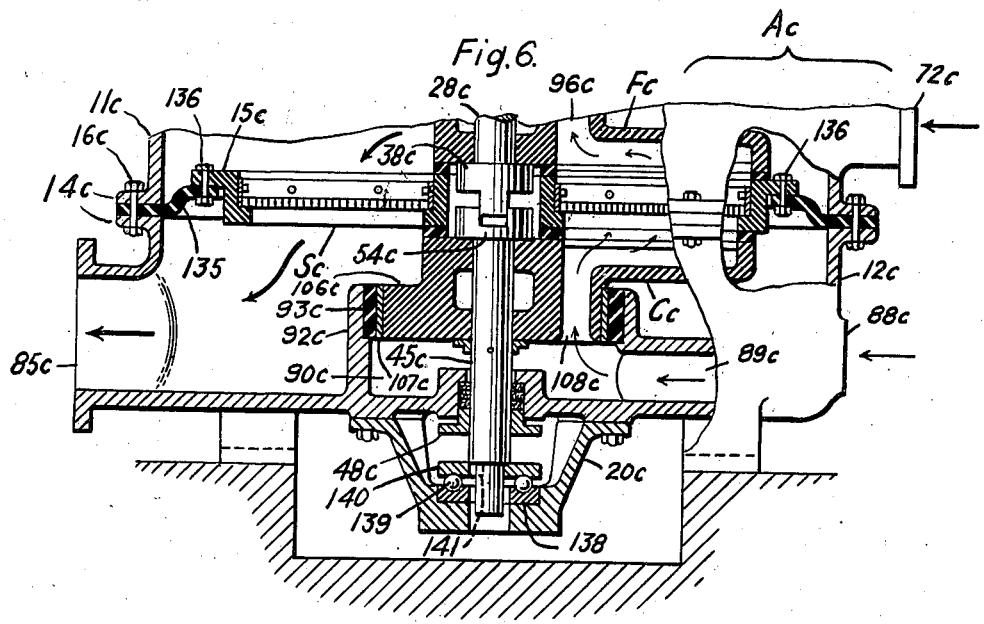
Fig. 6 is a view similar to the lower portion of Fig. 1, of the invention in another form.

In the devices of each of Figs. 1, 4 and 7, two of the mechanisms M could be employed, one associated with each of the cleanser and flushing boxes, whereas, in the devices of Figs. 6 and 10, which may also be substituted in the devices of the other figures, only one of the mechanisms M may be necessary, as will further appear.

Device of Fig. 6

In this figure, parts corresponding to parts heretofore set forth, are designated by corresponding letters and numerals having the subscript c.

The strainer Sc, instead of being rigidly mounted, as in the devices of Figs. 1, 4, 5 and 7, is floatingly mounted, between the shells 11c and 12c of the casing Ac, as by a ringlike flexible diaphragm 135, of material, such as rubber, having a portion between the flanges 14c, held, as by bolts 16c, and a portion secured to a flange 15c of the strainer Sc, as by bolts 136.

With this device, only one adjusting means, such as any of those shown at the tops of Figs. 1, 5 and 7, or at the bottom of Fig. 10, may be employed, to simultaneously adjust the bearings of each of the boxes Fc and Cc relative to the strainer.

The device of Fig. 6 further comprises a shaft 28c, a coupling head 38c, a shaft 45c, a coupling head 54c, a cleanser fluid inlet port 88c, a passageway 89c, an annular space 90c, an flange 92c, a bearing 93c, a wearing sleeve 107c, a bearing portion 106c, a passageway 96c, an inlet port 72c, for fluid to be strained, a bottom gland 48c, an outlet port 85c, for the strained fluid, and a bottom bracket 20c, on which is supported a thrust bearing for the shaft 45c, comprising a stationary ballrace member 138, ball bearings 139, and a movable ball-race member 140 secured to the shaft 45c, as by a key 141.

Device of Figs. 7, 8 and 9

In these figures, parts corresponding to parts heretofore described, are designated by corresponding letters and numerals having the subscript d.

The device is of a type in which no cleanser box is employed, but in which the fluid and pressure, for the back wash, or counterflow, through the flushing box Fd, are derived from the strained fluid in the bottom shell 12d.

A strainer Sd, having grids 62d, as above described, is secured, as by a flange 15d and bolts 16d, between flanges 14d on the upper and lower shells 11d and 12d of the casing Ad, and a cylindrical portion 56d, depending from the flange 15d, from which spokes 57d extend to a hub 58d. Fluid to be strained, is introduced into the casing Ad, through an inlet port 72d, and, after passing the strainer, has the major portion discharged through an outlet port 85d, while a certain amount of it, indicated by light-line arrows, flows backwardly, through the grids 62d, into a sector-like space 97d of the flushing box Fd, and from the latter, through a passageway 144, which is made up by alined apertures in the hub 58d of the strainer, in a tubular standard or support 145 for the strainer, and in a portion 146 of the bottom wall of the shell 12d.

A bracket 19d, secured to the top shell 11d, as by screws 21d, has a portion 22d in which a sleeve or nut 26d is screw threadably mounted. The sleeve 26d is fixedly longitudinally of a shaft 28d, as by collars 30d and pins 31d. The shaft 28d has a coupling 39d, at its upper end, for attachment to driving means, such as a motor supported by an extension 42d of the bracket 19d, to which it is attached, as by bolts 43d. The shaft extends through a gland 32d, in the top wall of the shell lid, into a sleeve 148 of the flushing box Fd, to which it is fixed, as by a key 149.

As seen in Figs. 8 and 9, the flushing box Fd comprises wings 102d, extending laterally therefrom parallel to the plane of the disk-like strainer Sd, to span three of the grids 62d, as above set forth, whereby the box may be continuously rotated by the shaft 28d, without causing commingling of the cleanser fluid in the box with the fluid to be strained.

Device of Fig. 10

In this figure, parts corresponding to parts heretofore described, are designated by corresponding letters and numerals having the subscript e.

The device is adapted for pressure service only, when the strained fluid is of a nature and pressure suitable for effectively back washing the strainer Se. As in the case of the device of Figs. 7, 8 and 9, no cleanser box is required, since the strained fluid flows directly from the discharge chamber in the shell 12e, of the casing Ae, through the grids 62e, and thence, through a space 97e, a passageway 96e, an annular space 75e, and a passageway 74e, to an outlet 73e in the upper shell 11e.

The strainer Se is floatingly secured to the casing, as by bolts 136e, a flexible diaphragm 135e, bolts 16e, and flanges 14e, and is adjustably mounted from below, as by a stud 152 having a head 153, at its upper end, on which the strainer rests.

The stud 152 has a screw threaded portion 151, at its lower end, in a portion 154 of the shell 12e, to which it is locked, as by nuts 155. A polygonal lower end portion 156, of the stud 152, provides a wrench fitting, whereby the stud 152 may be turned, in the portion 152, to raise or lower the strainer Se.

A circuit, for the fluid to be strained, is provided between an inlet port 72e of the shell 11e, and, through the strainer Se, to an outlet port 85e of the shell 12e.

The flushing box Fe further comprises a hub 33e, having an annular bearing portion 94e, and a passageway 96e to an annular space 75e, a passageway 74e, and an outlet 73e. A flange 76e, depending from the top wall of the shell 11e, forms the annular space 75e, and supports a yieldable bearing 79e for cooperation with a wearing sleeve 95e on the annular bearing portion 94e.

A bracket 19e, secured to the shell 11e, as by screws 21e, has a collar portion 22e, to which a sleeve 157 is fixed, as by a pin 158. A shaft 28e, having a coupling 39e at its upper end, is rotatably journaled in the sleeve 157, and fixed axially thereto, as by collars 30e and pins 31e.

The shaft 28e extends through a gland 32e, to the hub 33e of the flushing box Fe, to which it is fixed, as by a key 159, for rotating the latter.

This device may also be equipped with the mechanism M, in the place of the stud 152 and associated parts, or in addition to these parts, at the top of the device, in the place of the sleeve 157 and adjacent elements, whereby the box Fe, as may any box corresponding to a box in other of the forms, will move bodily relatively to the strainer, or the strainer relatively to the box, in response to the interposition of an object between the bearing surfaces of the strainer and the box.

I claim as my invention:

1. In combination, a casing, a strainer operating as a partition dividing the casing into inlet and outlet chambers, means for mounting the strainer in floating sealed relation to the casing including a flexible element connected between the casing and the strainer, means providing for the flow of fluid through the strainer, movable flushing box means for cooperation with the strainer, and means providing for the flow of cleanser fluid through the strainer and the flushing box means in direction counter to the flow of fluid being strained.

2. In combination, a casing, a strainer in the casing, bearing means associated with the strainer at opposite sides thereof, means providing for the flow of fluid through the strainer, a rotatable unit including cleanser and flushing box means in register with each other at opposite sides of the strainer and carrying bearing means for rubbing contact with said strainer bearing means at the corresponding sides thereof, respectively, means providing for the flow of cleansing fluid from the cleanser box means through the strainer and the flushing box means in direction counter to the flow of fluid being strained, means for rotating said unit, and means for adjusting said cleanser box bearing means and said flushing box bearing means independently of each other relative to the respective cooperating strainer bearing means therefor.

3. In combination, a casing having upper inlet means for fluid to be strained, lower outlet means for the strained fluid and discharge means for fluid carrying residue from the strainer, a strainer in the casing between said inlet and outlet means, upper journal means associated with the strainer, upper flushing box means movable about a vertical axis and communicating with said discharge means and carrying lower bearing means for said strainer journal means, and means for positively yieldably opposing movement of said journal and bearing means away from, and biasing the same toward, each other along said axis.

4. In combination, a casing having upper inlet means for fluid to be strained, lower outlet means for the strained fluid and bottom discharge means for fluid carrying residue from the strainer, a strainer in the casing between said inlet and outlet means, flushing box means movable on the strainer thereabove having radial and axial passageway means, and means for supporting the strainer from below constituted both as passageway means between said axial passageway means and said discharge means and as means for vertically adjusting the position of the strainer.

5. In combination, a casing having upper and lower inlet and outlet means for fluid to be strained and the strained fluid, respectively, and lower discharge means for fluid carrying residue from the strainer, a strainer in the casing between said inlet and outlet means above said discharge means, upper journal means associated with the strainer, upper flushing box means movable about a vertical axis having radial passageway means and axial passageway means communicating through the strainer hub with said discharge means and carrying lower bearing means for said strainer journal means, and means for positively yieldably opposing movement of said journal and bearing means away from, and biasing the same toward, each other.

6. In combination, a casing having upper inlet means for fluid to be strained, lower outlet means for the strained fluid and discharge means for fluid carrying residue from the strainer, a strainer in the casing between said inlet and outlet means, flushing box means movable on the strainer thereabove about a vertical axis and communicating with said discharge means, and means for supporting the strainer from below and vertically adjusting the position thereof.

7. In combination, a casing having upper inlet means for fluid to be strained, lower outlet means for the strained fluid and bottom discharge means for fluid carrying residue from the strainer, a strainer in the casing between said inlet and outlet means, flushing box means movable on the strainer thereabove having radial and axial passageway means, and means for supporting the strainer from below constituting passageway means between said axial passageway means and said discharge means.

GEORGE L. MacNEILL.